US 6,629,454 B2

(12) United States Patent
Lundqvist

(10) Patent No.: US 6,629,454 B2
(45) Date of Patent: Oct. 7, 2003

(54) TIRE PRESSURE MONITORING DEVICE

(76) Inventor: Torbjörn Boson Lundqvist, 24040 Camino Del Avion, No. A303, Monarch Beach, CA (US) 92629

( * ) Notice: Subject to any disclaimer, the term of this patent is extended or adjusted under 35 U.S.C. 154(b) by 0 days.

(21) Appl. No.: 09/990,234

(22) Filed: Nov. 21, 2001

(65) Prior Publication Data

US 2002/0059825 A1 May 23, 2002

Related U.S. Application Data

(63) Continuation-in-part of application No. 09/716,295, filed on Nov. 21, 2000.

(51) Int. Cl.[7] .................................... B60C 23/04
(52) U.S. Cl. ........................ 73/146; 340/442
(58) Field of Search ................ 73/146, 146.2, 73/146.3, 146.4, 146.5, 146.8; 340/447, 442

(56) References Cited

U.S. PATENT DOCUMENTS

| 4,819,686 A | * | 4/1989 | Achterholt | 137/229 |
| 4,890,090 A | * | 12/1989 | Ballyns | 340/442 |
| 4,975,679 A | * | 12/1990 | Ballyns | 340/442 |
| 5,055,826 A | * | 10/1991 | Ballyns | 340/442 |
| 5,119,066 A | * | 6/1992 | Ballyns | 73/146.5 |
| 5,557,256 A | * | 9/1996 | Achterholt | 340/442 |
| 5,856,619 A |  | 1/1999 | Wang |  |
| 5,886,254 A | * | 3/1999 | Chi | 73/146.8 |
| 6,006,600 A |  | 12/1999 | Cheng |  |

* cited by examiner

Primary Examiner—Edward Lefkowitz
Assistant Examiner—Andre Allen
(74) Attorney, Agent, or Firm—Preston Gates & Ells LLP; John W. Wallen, III

(57) ABSTRACT

A low tire pressure monitoring device that is affixed to a tire valve stem and methods of using the same. The monitoring device comprises a housing having a counter-pressure chamber, a main pressure chamber, and a flexible membrane that separates the two chambers. The monitoring device is calibrated by trapping the tire's initial air pressure in the counter-pressure chamber. The air pressure within the main pressure chamber is equivalent to the air pressure within the tire. Over the course of time, the air pressure within the tire and concomitantly the air pressure within the main pressure chamber decreases. When the pressure in the counter-pressure is greater than the pressure within the main pressure chamber, the flexible membrane touches and completes an electrical circuit and a warning signal is emitted.

27 Claims, 7 Drawing Sheets

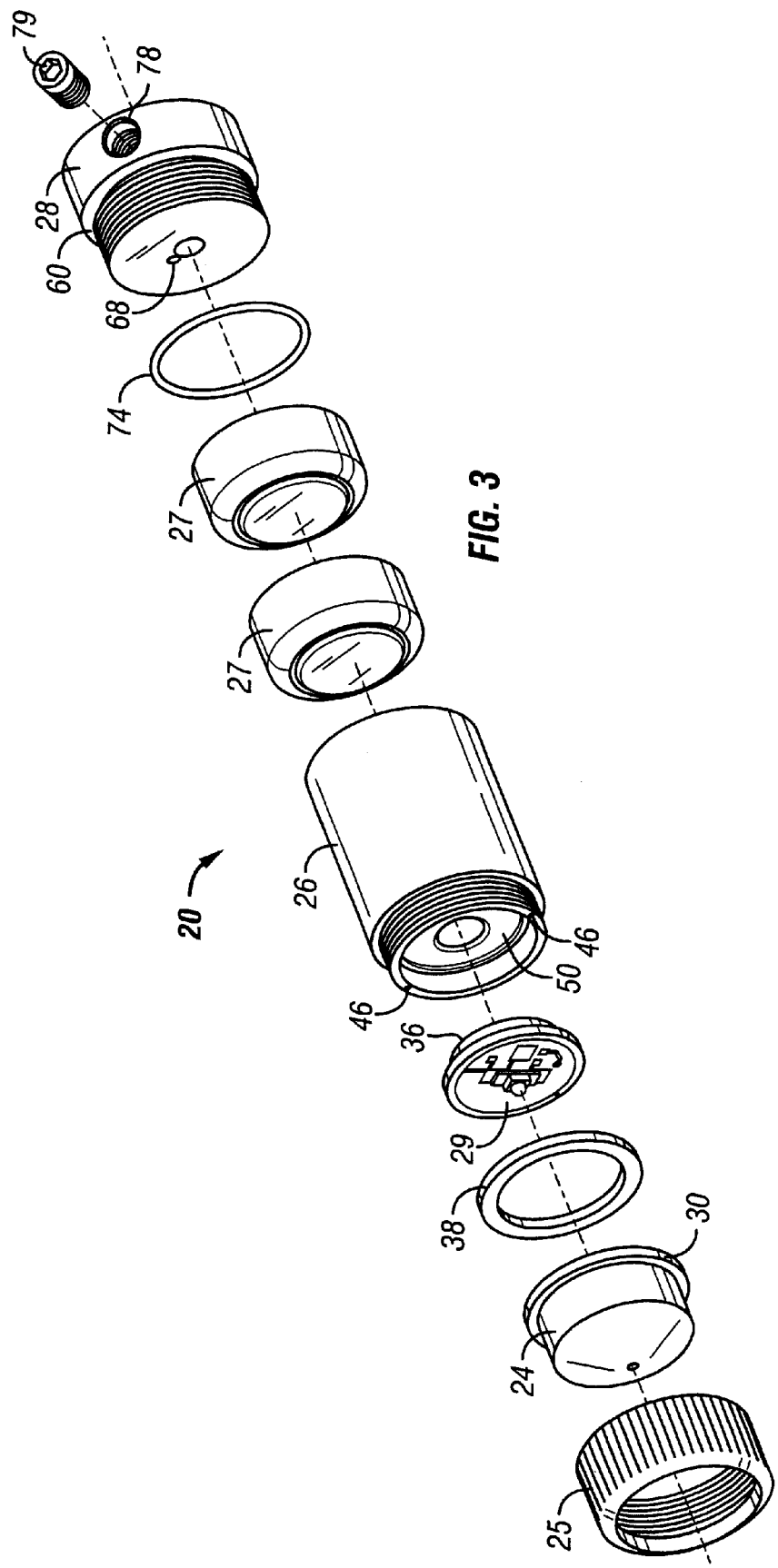

TIRE PRESSURE MONITORING DEVICE

CROSS REFERENCE TO RELATED APPLICATIONS

This application is a Continuation-in-Part of U.S. patent application Ser. No. 09/716,295, filed Nov. 21, 2000, and whose entire contents are hereby incorporated by reference.

FIELD OF THE INVENTION

The present invention relates particularly to tire pressure monitoring devices attached to tire valve stems.

BACKGROUND OF THE INVENTION

One of the most common tire-related problems is under-inflation of the tires. The tire is usually inflated when installed and not checked afterwards. Despite the notices in vehicle owner's manuals, very few people actually check the tire pressure regularly. Driving with tire pressure that is too low will not only affect the handling characteristics of the vehicle in a negative manner but it can also be a contributing factor to tire tread separation. Lately, there have been over a hundred people killed in the United States due to vehicle rollovers which where directly related to tire tread separation. Thus, the importance of proper air pressure cannot be over-emphasized. Unless tire pressure is proper, maximum fuel efficiency cannot be obtained and a tire that is under inflated cannot meet warranty inspection as to mileage.

With the advent of a large variety of automobile tires, there is now a large variation in the recommended air pressure to be used. For example, there are many automobiles that require different inflation pressures in the front and rear tires. In addition, there are many utility vehicles that require either much higher or much lower tire pressure than customarily encountered in automobile tires. Consequently, once a car owner has inflated the tires to the proper pressure, the user must keep track of the proper pressure for each tire. After driving on the tires for awhile, the user must be able to determine when the pressure has changed in a tire sufficiently such that the user should add more air.

BRIEF SUMMARY OF THE INVENTION

The present invention relates to a tire pressure monitoring device that is affixed to a tire valve stem. The tire pressure monitoring device alerts a driver when the tire pressure has dropped a predetermined amount relative to an initial tire pressure.

In certain embodiments of the invention, a tire pressure monitoring device that is installed on a tire valve stem reacts to a drop in a tire's air pressure. For example, the device may indicate by visual, audio, electromagnetic or other means that the tire pressure has dropped by at least a predetermined amount relative to an initial tire pressure. Preferably, the device is compact and does not adversely affect the balance of a tire. In one embodiment, the tire pressure monitoring device does not utilize or rely on moving mechanical parts with the exception of the movement of a flexible membrane. Accordingly, in a preferred embodiment of the invention, centrifugal forces, dirt, debris and other road hazards do not adversely affect the operation or accuracy of the device.

In an exemplary embodiment of the present invention, the tire pressure monitoring device comprises a housing that is affixed to a tire valve stem. The housing includes two pressure chambers separated by a flexible membrane. When the device is initially attached to the tire valve, a first pressure chamber is pressurized with air pressure from the tire. This first chamber is then sealed, and the tire pressure monitoring device is now calibrated. The second chamber also is pressurized with air from the tire, but the second chamber is in constant air pressure communication with the tire. Accordingly, when the tire pressure decreases, there is a concomitant decrease in pressure within the second chamber. When the air pressure within the second chamber is less than the air pressure within the first chamber by a predetermined pressure differential, a signaling means warns the driver that the tire pressure is low.

The present invention also relates to methods of using a tire pressure monitoring device. According to one such method, the device is attached to a tire valve and subsequently calibrated. The attached device monitors the pressure differential between the air pressure within the device and the tire's current air pressure. A warning signal is emitted when the pressure differential exceeds a predetermined pressure differential. The warning signal may be an optical signal such as a constant or flashing light, an audio signal such as from a buzzer or beeper, an electromagnetic signal such as a broadcast or transmitted analog or digital signal, an electrical signal that causes a display on the device or elsewhere to display a message relative to the change in tire pressure, or any other type of low pressure warning signal.

BRIEF DESCRIPTION OF THE DRAWINGS

FIG. 3 is an exploded perspective view of the tire pressure monitoring device of FIGS. 2A–B;

DETAILED DESCRIPTION OF THE INVENTION

The present invention relates to a tire pressure monitoring device that is affixed to a tire valve stem and methods of using the device. The tire pressure monitoring device reacts to a drop in tire pressure by a predetermined pressure differential by, for example, emitting a visual, audio, electrical, electromagnetic or other signal in response to the drop in tire pressure.

Figure 1:
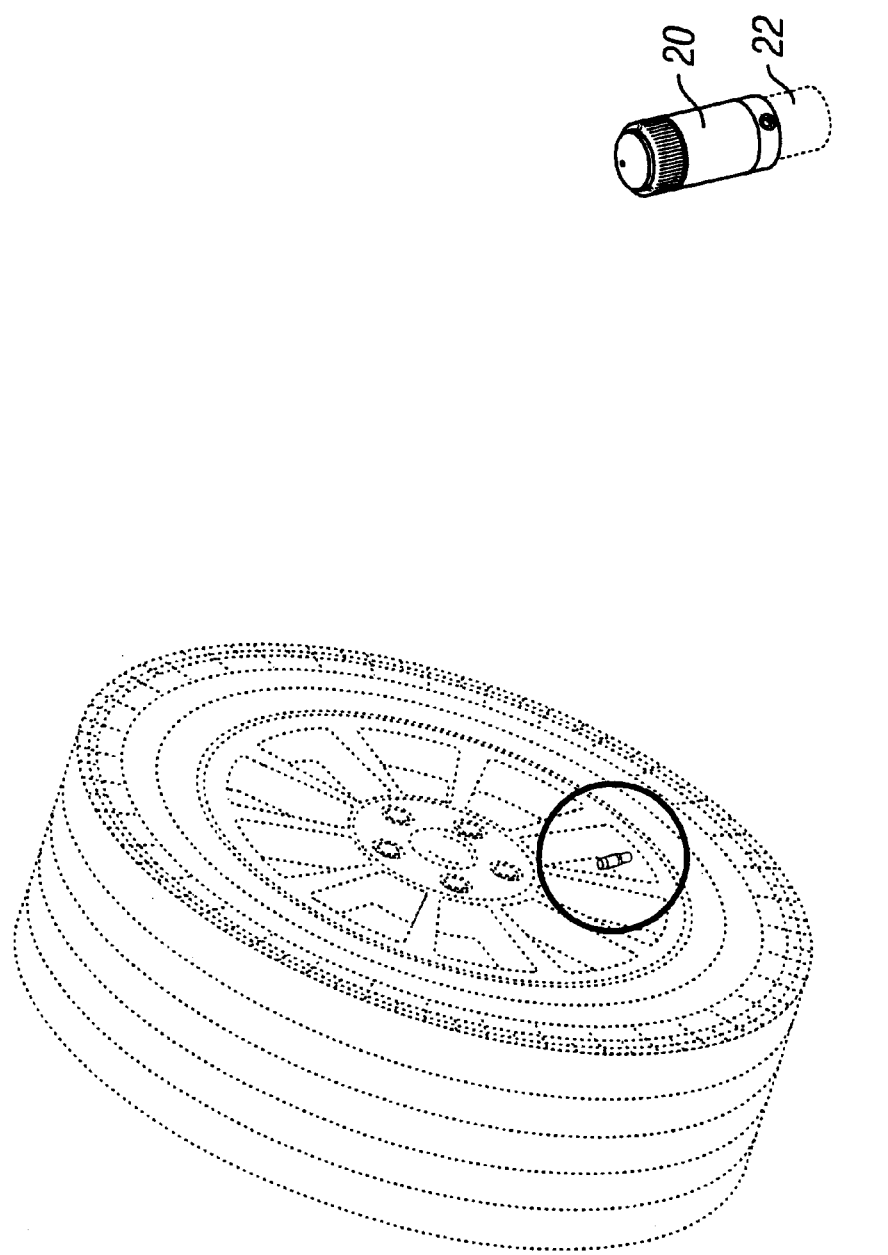
FIG. 1 is a perspective view of the tire pressure monitoring device of the present invention mounted on a tire.
Figure 2A:
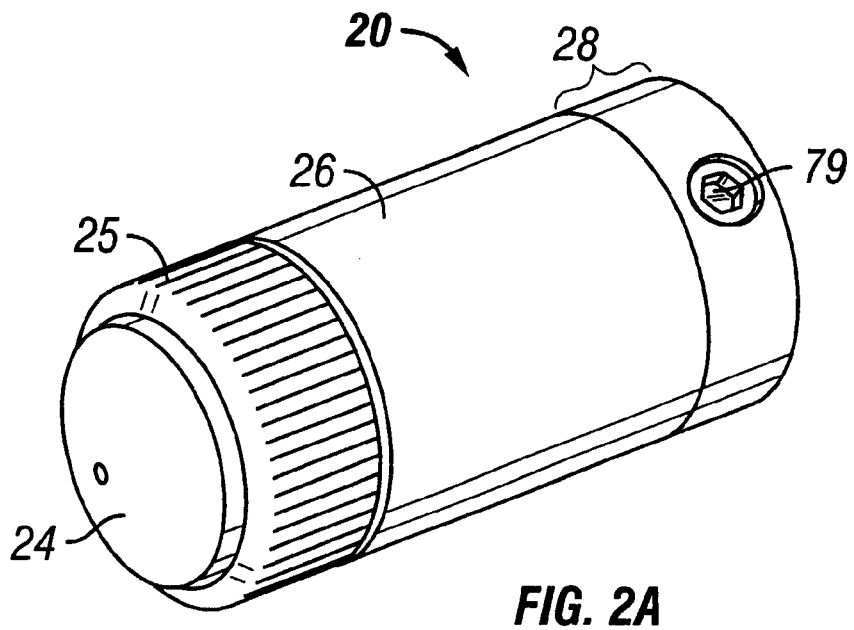
FIGS. 2A–B are perspective views of tire pressure monitoring device.
Figure 2B:
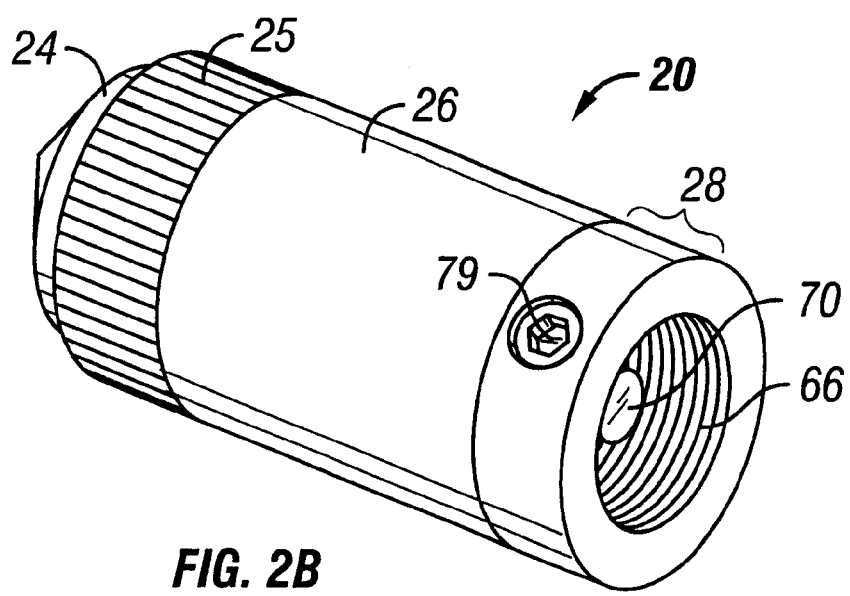
Figure 4:
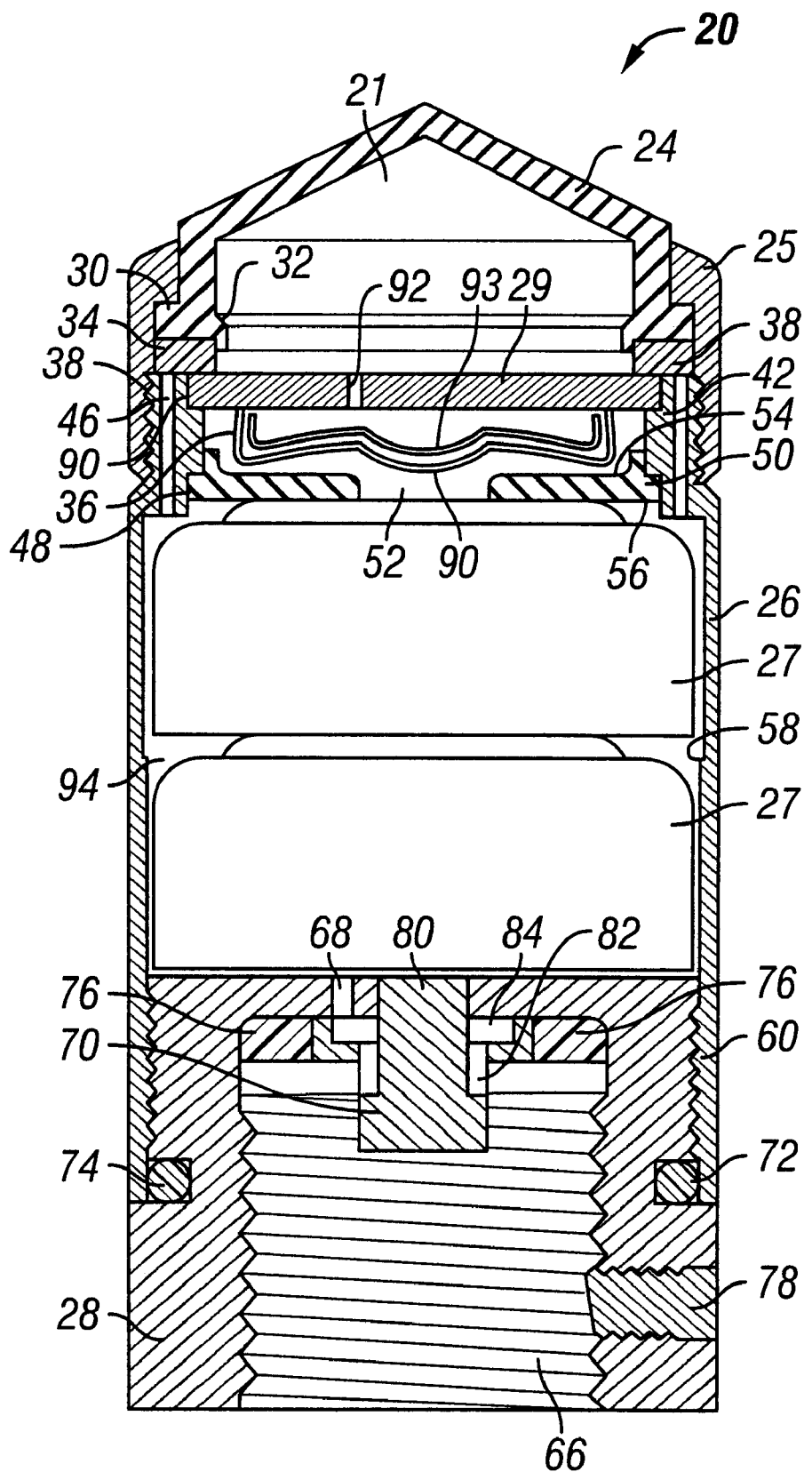
FIG. 4 is a cross-sectional view of the tire pressure monitoring device of FIG. 3.

Turning now to FIG. 1, an alternative embodiment the tire pressure monitoring device 20 is illustrated and is mounted on the valve stem 22 of a tire. The tire pressure monitoring device 20 comprises a lens 24, a main body 26, and a lower body 28 as shown in FIGS. 2–4. The lens 24 is generally made from a plastic material such as, but not limited to, acrylic, polycarbonate, and the like. The lens 24 is cylindrically-shaped with a pointed top as shown in FIG. 2. In alternate embodiments, the lens may be domed or have a generally cylindrical shape.

The lens encloses the top of the device 20 and defines a counter-pressure chamber 21 having a volume of air $V_1$, having a pressure $P_1$. This volume of air $V_1$ is important because there needs to be a sufficient air volume (and concomitantly sufficient air pressure) to move a flexible membrane 36. The lens 24 also includes a screw top flange 30, a gasket-retaining flange 32, and an annular recess 34. The lens 24 is attached to the main body 26 by a screw cap 25, and the screw top flange 30 provides a surface that engages the screw cap 25. The gasket-retaining flange 32 and the annular recess 34 are located on the bottom edge of the lens. The flange 32 and the recess 34 are adapted to position and hold the Seal 38 about the perimeter of the device 20.

In an exemplary embodiment, the Seal 38 may be made from a conductive rubber material. This provides an alternate route for the positive charge to travel to the top of the PC board. That is, the positive charge may migrate from the positive terminal of the battery through the main housing to the positive terminal of the LED via the channel 90 on the PC board or through the conductive Seal 38 to the positive terminal of the LED.

FIG. 4 illustrates the main body 26 of the tire pressure monitoring device 20. The main body 26 is a generally cylindrical structure that is adapted to hold a printed circuit (PC) board 29 and at least one battery 27. As shown in FIG. 4, the main housing is adapted to hold two batteries. Those skilled in the art will appreciate that the length of the main body 26 may be adapted to the size and number of batteries used in the monitoring device 20. In an exemplary embodiment, the main body is made of aluminum; however, in alternate embodiments of the present invention, the main body may be made from other metals or plastic. In those embodiments where the main body is made of plastic, those skilled in the art will appreciate that conductive leads need to provided on the inner surface of the main body in order to complete an electrical circuit.

The outer portion of the main housing 26 has threads 40 located at the top of the housing 26 adapted to mate with the threads of the screw cap 25. The threads 40 may be optionally provided with a pressure and/or heat activated adhesive known in the art for locking threads. A suitable adhesive may be available from the Loctite Americas of Rocky Hill, Conn. The adhesive seals the counter-pressure chamber and prevents the internal components of the device from being damaged by dirt and debris. Furthermore, an annular ridge 42 is located at the top of the main body 26 which receives the printed circuit (PC) board 44. The main body also includes an annular recess 48 that is adapted to receive a nonconductive washer 50.

Figure 5:
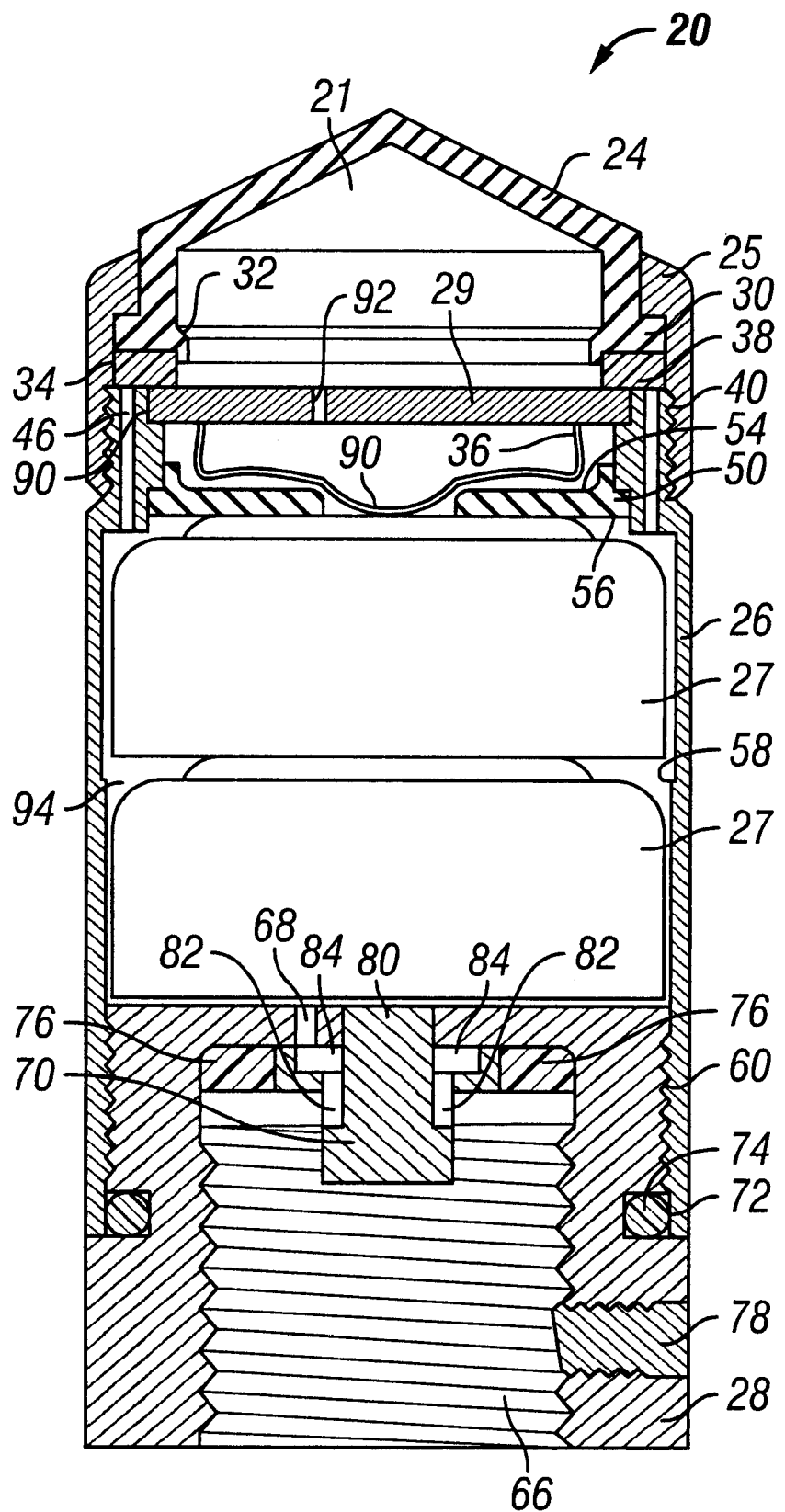
FIG. 5 is a cross-sectional view of the tire pressure monitoring device where the flexible membrane has contacted the battery.

The washer 50 is a circular disk having an opening 52 substantially centered on the washer 50. As shown in FIGS. 4 and 5, one surface 54 of the washer is shaped similarly to the flexible membrane 36 in an extended position. By contouring the washer surface 54 like the flexible membrane 36, the membrane 36 is less likely to be damaged or deformed because the washer surface prevents the over-extension of the flexible membrane 36. The second surface 56 of the washer 50 is substantially flat and prevents the battery 27 from continuously contacting the flexible membrane 36. Furthermore, the washer 56 ensures a consistent distance between the flexible membrane 36 and the negative terminal of the battery 27. In order to compensate for the different heights of batteries, a biasing member (not shown) such as, but not limited to, a spring or washer may be placed below the second battery 27 to insure that the top battery engages the second surface 56 of washer 50.

The main housing further includes a recess 58 within the inner lumen of the housing. The recess 58 is adapted to receive a strip of nonconductive material such as, but not limited to, plastic or nylon. The recess 58 location corresponds to the position of the first battery 27 when inserted into the main housing 26. The plastic material insulates a portion of the main housing to prevent a short circuit if the first battery 27 were to contact the main housing. In an alternate embodiment of the present invention, the circumference of the first battery 27 may be wrapped with an insulating material thereby eliminating the need for a recess 58 within the main housing 26. In yet another embodiment of the present invention, a single 3.0V battery may be used thereby eliminating the need for a series of batteries. Accordingly, in this embodiment, the need for a recess and an insulating material is eliminated.

The main housing 26 is also provided with at least one channel 46 located about the circumference of the main body 26. As shown in FIGS. 3–4, the main housing 26 is provided with two channels 46. The channels 46 allow air from the main housing 26 into the counter-pressure chamber 21 when the screw cap is not tightened. However, as the screw cap 25 is tightened, the lens 24 and the Seal 38 are pulled toward the main housing 26 thereby sealing the channels 46.

At the bottom of the main housing 26, threads 60 are provided on the inner surface of the main housing 26 that mate with threads located on the outer surface of the lower housing 28. The threads 60 may be optionally provided with a pressure and/or heat activated adhesive. The adhesive ensures that the main housing 26 and the lower housing 28 are tightly joined together to prevent any air from leaking out from the main housing. Additionally, the lower housing 28 includes a recess 72 located on the outer surface of the lower housing 28. The recess 72 is adapted to receive a seal 74, gasket, or other sealing means. The Seal 74 provides a seal between the main housing 26 and the lower housing 28 thereby preventing air from escaping from the main housing 26 when the device 20 is attached to the tire stem. 27 The lower housing 28 includes a substantially circular top 64 having a generally cylindrical body. The lumen of the cylindrical body is provided with a threaded internal wall 66. The threads on the internal wall 66 are adapted to mate with standard 5/16"-32 threads per inch thread found on most tire valve stems. The circular top 65 of the lower housing includes at least one channel 68 that puts the lumen of the main body 26 in communication with the lumen of the lower housing 28. The circular top 65 also include a stem-opening prong 70. The stem-opening prong 70 is adapted to engage and depress a tire needle valve (not shown) when the tire pressure monitoring device 20 is being attached to the tire valve stem. Furthermore, an additional sealing means 76 such as, but not limited to, a seal or gasket may be placed within the lumen of the lower housing 28 to prevent air from leaking out of the lower housing when the device 20 is attached to the tire stem.

Moreover, at least one threaded bore 78 may be included on the lower housing 28 as shown in FIGS. 2, 4. The bore 78 that extends through the wall of the lower housing 28 and is substantially perpendicular to the inner lumen of the lower housing. A screw 79 may be inserted into the bore 78 to prevent the device 20 from being removed from the tire valve. In an exemplary embodiment, the screw 79 may be made of nylon to prevent damage to the threads on the tire valve stem. However, those skilled in the art will appreciate that the screw 79 may be made from a plurality materials such as, but not limited to, plastic, high-strength ceramic or metals.

Referring back to FIG. 4, a the stem-opening prong 70 is provided within the lower housing 28. The stem opening prong 70 comprises a cylindrical body 80 and at least one channel 82 located within the body. FIGS. 4–5 illustrate the stem opening prong having two channels 82. The channels 82 are in communication with an annular conduit 84 that is formed about the circumference of the prong 70. By providing the annular conduit 84, the manufacturing process is simplified because the annular conduit eliminates the need to align the channel 82 with the channel 68 located on the circular top of the lower housing 28. In an alternate embodiment, the lower housing and the main pressure chamber are in communication with one another via a bore through the circular top of the lower housing.

Figure 6A:
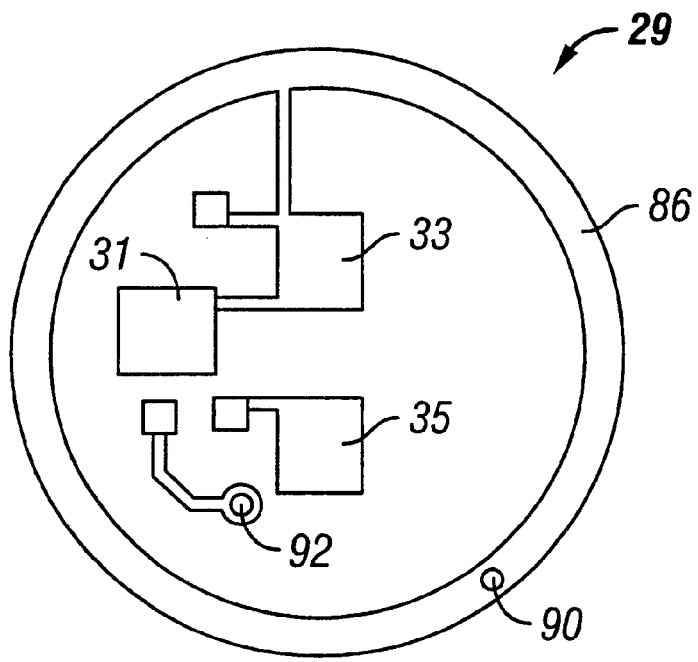
FIG. 6A is a top view of the printed circuit board that is installed in the tire pressure monitoring device of the present invention.
Figure 6B:
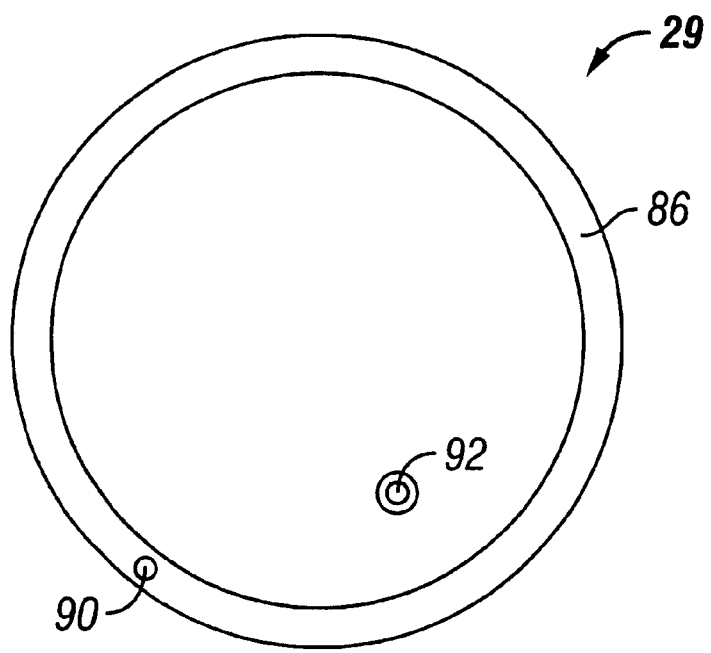
FIG. 6B is a bottom view of the printed circuit board of FIG. 6A.

FIGS. 6A–B illustrate an exemplary embodiment of the PC board 29 of the present invention. The PC board 29 houses the circuitry associated with controlling the duration and frequency of the flashing of the LED. The outer ring 86 of the board 29 is connected to the positive terminal of the batteries through the main housing 26 of the device. The main housing 26 is made of aluminum and the positive charge from the battery contacts the lower portion 88 of the PC board 29. The positive charge travels to the positive terminal 33 of the LED, which is located on the top of the PC board, by migrating through a hole 90 located on the periphery of the PC board 29. The hole 90 may be lined with conductive material or the conductive material may fill the hole 90 to conduct the positive charge. Alternately, the positive charge may get to the top of the PC board by travelling through the conductive seal.

The PC board 29 further includes a channel 92 that is lined with a conductive material. The channel 92 conducts negative charge from the bottom of the PC board to the top of the PC board then to the negative terminal 35 of the LED. The channel 92 also acts as a conduit between the counter-pressure chamber and the space between the bottom of the PC board 29 and the flexible membrane 36. The space becomes part of the counter-pressure chamber.

As shown in FIGS. 6A–B, the PC board 29 also includes a IC chip (not shown) mounted on the PC board at a contact area 31. The IC chip controls the frequency of the flashes from the LED light (not shown). It is contemplated that the IC chip operate at a range between 1.0 Hz to 0.5 Hz which translates into a 1 to 2 second duration, respectively, between flashes. Those skilled in the art will appreciate that the frequency of the IC chip may be adapted to frequencies beyond the recited ranges. Furthermore, the IC chip is designed to have the LED lit for 0.125 seconds. However, those skilled in the art will appreciate that the duration of the LED may be shorter or longer than 0.125 seconds. Those skilled in the art will appreciate that different circuitry and electronics will enable the device 20 to transmit different signaling means such as, but not limited to, sound, radio frequency (RF) signal, infrared (IR) signal, or a combination thereof. In those embodiments when an RF or IR signal is transmitted, a remote receiver may be provided within the vehicle or on a key fob to notify a driver that the tire pressure for a specific wheel is low.

Referring back to FIG. 4, the PC board 29 is positioned within the tire pressure monitoring device 20 along the annular ridge 42 of the main housing 26. A flexible membrane 36 is soldered to the PC board 29. In an exemplary embodiment, the flexible membrane 36 is made from a Beryllium-Copper alloy. However, those skilled in the art will appreciate that the flexible membrane 36 may be made from a plurality of metals such as, but not limited, to brass or other metals. Furthermore, it is contemplated that the flexible membrane 36 may also be made of other conductive substances such as, but not limited to, conductive rubber. The flexible membrane 36 has a thickness of approximately 0.001" when made of ½ hard Beryllium-Copper alloy. The flexible membrane 36 is a generally circular member having upturned edges as shown in FIG. 4. The flexible membrane 36 also includes a convex nipple 90 that extends from the surface of the flexible membrane. The height of the nipple 90 is substantially equal to the depth of the opening 52 in the nonconductive washer 50.

In a first position, the flexible membrane has an overall concave shape as shown in FIG. 4. In a second position, the air pressure from the counter pressure chamber has deflected the flexible membrane such that the nipple 90 contacts the battery 27, as FIG. 5 shows.

The pressure differential at which the flexible membrane moves from a first position to a second position is determined by the diameter, thickness, hardness, or degree of concavity of the flexible membrane. A smaller flexible membrane is more difficult to move as compared to a larger membrane. A thicker membrane is more difficult to move as compared to a thinner membrane. A membrane that is ½ hard is easier to move than a ¾ hard, full hard, or spring tempered material. The hardness of the material may be adjusted by heat treating the material.

According to one exemplary embodiment of the present invention, the flexible membrane may contact the battery when there is an approximately 2 to 4 psi pressure differential. It is contemplated that a device having this flexible membrane may be used to monitor the tire pressure for automobiles, motorcycles, bicycles, or other vehicles having moderate tire pressure applications.

In yet another exemplary embodiment, the flexible membrane will move when there is an approximately 10 psi pressure differential. It is contemplated that this embodiment may be used for tires on tractor trailer trucks or other large vehicles having high tire pressures (approximately 100 psi). Those skilled in the art will appreciate that the flexible membrane may be even calibrated so that the device may be able to detect very small pressure differentials.

FIG. 4 also shows an optional stiffening member 93 that lines the inner surface of the flexible membrane 36. The stiffening member 93 is a free-floating member that follows the overall shape of the flexible membrane 36. The stiffening member 93 prevents the flexible membrane 36 from collapsing in the event that the pressure in the main pressure chamber is greater than the pressure within the counter-pressure chamber. In this scenario, without the stiffening member, the pressure within the main chamber may force the flexible membrane towards the PC board thereby damaging or destroying the flexible membrane. However, with the optional stiffening member 93 in place, the overall shape of the flexible membrane may be retained when the pressure within the main pressure chamber is greater than the counter pressure chamber.

The present invention also relates to methods of using the tire pressure monitoring device 20. Generally, the device 20 is screwed onto the a valve stem and calibrated. Once calibrated, the device constantly monitors for a drop in tire pressure. When the tire pressure drops below the calibrated threshold, a warning signal is emitted. The individual user may then remove the device and add air to the tire. The device 20 is then re-attached to the tire valve stem and continues to monitor tire pressure.

The present invention is advantageous over prior art tire pressure monitoring systems. The tire pressure monitoring device of the present invention may be compact and self-contained, so that the device can be made to not adversely affect wheel and tire balance. Embodiments of the invention may be made so that there are no moving parts other than the moving portion of the membrane. With hardly any moving parts, centrifugal forces due to tire rotation and the like, do not affect the operation of certain embodiments of the device. Furthermore, as opposed to the old hit-and-miss method of visually inspecting a tire to see if the tire pressure "looks low," the present device is more accurate in that it is activated when the tire pressure changes by a predetermined pressure differential. The device then indicates in some way that the tire pressure is low, such as by flashing a light or emitting a sound or transmitting a signal.

Moreover, the device of the present invention may be applied to a wide variety of tire applications. That is, prior art devices are pre-calibrated for a specific tire pressures (e.g., 32 psi or 100 psi), and they measure deviations from these precalibrated tire pressures. In contrast, the device of the present invention is calibrated based upon the tire pressure found within a tire at a starting time, and the device is activated when the tire pressure changes by a predetermined pressure deviation from the initial tire pressure. Accordingly, the device 20 may be used in a wide variety of tire applications using a single device. For instance, when the recommended tire pressure for the front tires differs from the recommended tire pressure for the rear tires in certain automobiles, the same set of devices may be used for all the tires. No pre-calibration is necessary, as the devices are calibrated when they are first attached to a tire.

Considering this further, when the device is first screwed onto the tire valve stem, the device needs to be calibrated. The device is calibrated by allowing air to enter the counter-pressure chamber. Normally, air is not able to enter or escape from the counter-pressure chamber 21 because the Seal seals the channels 46 shut. However, when the device 20 is initially affixed to the tire valve stem 22, air from the tire enters the main pressure chamber 94 through the channels 46 into the counter-pressure chamber 21 because the seals have not been secured onto the main housing. By allowing the air to enter into the counter-pressure chamber 21, the counter-pressure chamber possesses the same air pressure as the tire. Accordingly, the device 20 is now calibrated, and the screw cap may be tightened to seal the counter-pressure chamber 21.

Once calibrated, the device is constantly monitoring for a drop in the air pressure of the tire. At this point in time, the counter-pressure chamber, the main pressure chamber, and the tire have the same air pressure. Thus, equal amounts of pressure are exerted on the surface of the flexible membrane. Over time, however, the air pressure within the tire decreases. Accordingly, there will be a concomitant decrease in the air pressure within the main pressure chamber. In this situation, the air pressure within the counter-pressure chamber 21 is greater than the air pressure within the main pressure chamber 94. Thus, the air pressure within the counter-pressure chamber moves the flexible membrane 36 towards the negative terminal of the battery. By contacting the negative terminal, the electrical circuit is completed and a warning signal is transmitted. In an exemplary embodiment, the warning signal is a flashing LED. Those skilled in the art will appreciate that the present invention contemplates other signaling means such as sound, radio frequency, infrared light, or a combination thereof.

Additionally, once the device 20 is calibrated, the device 20 may be periodically removed to ensure that the batteries and circuitry are in working order. That is, when the device is calibrated, the counter-pressure chamber will have an air pressure equivalent to the tire pressure. Once the device is removed from the tire stem, the pressure within the main pressure chamber is equivalent to the ambient air pressure. Accordingly, the pressure differential between the counter-pressure chamber and the main pressure chamber is very large, and the flexible membrane will contact the battery and a warning signal will be emitted. Thus, by periodically removing the device 20, an individual may ensure that the batteries and the device are working properly.

The device is divided into two chambers, a main pressure chamber 94 and a counter-pressure chamber 21, that are separated by a flexible membrane 36. The device is calibrated and the air pressure in the counter-pressure chamber the main pressure chamber are equal. Over the course of time, the air pressure within the tire and the main pressure chamber decreases. When the pressure in the counter-pressure is greater than the pressure within the main pressure chamber, the flexible membrane 36 touches the battery 27 (as shown in FIG. 5) and completes an electrical circuit that emits a warning signal.

Figure 7:
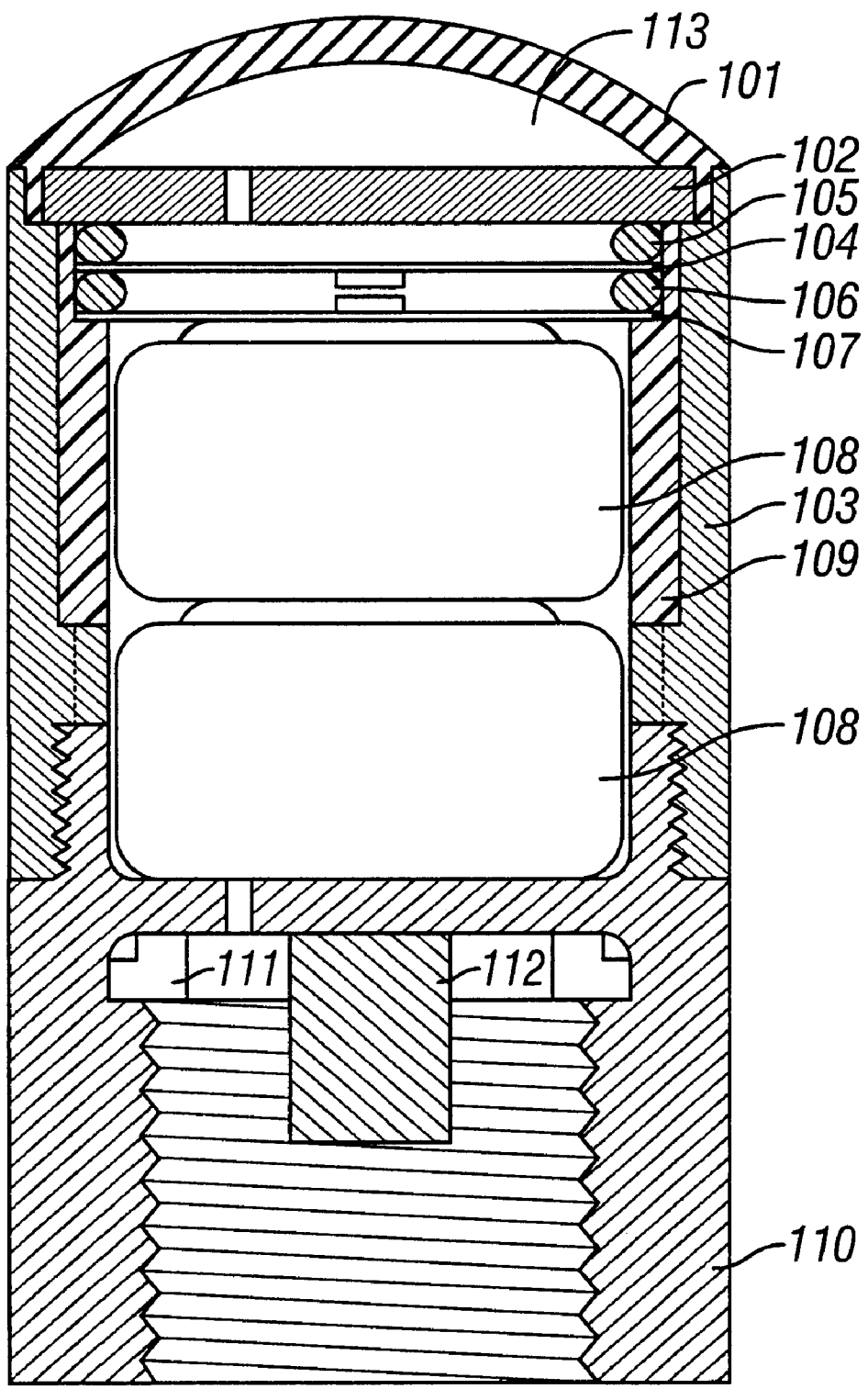
FIG. 7 is a cross-sectional view of an alternate embodiment of the tire pressure monitoring device of the present invention.

FIG. 7 is a cross-sectional view of an alternative embodiment of the present invention. A Top Part (101) shall be manufactured of a transparent material e.g. plastic. The blinking LED is mounted on a miniature Printed Circuit Board (PCB)(102). The PCB has contacts on its rim (108), where it rests on the Upper Metal Housing. These contacts will connect the circuitry on the PCB to the positive pole of the batteries. The PCB has contacts for the batteries (108) negative pole where the Conductive Seal (105) touches the PCB. The upper metal hosing (103) has an exact fit for the transparent Top Part (101), which will be glued in place for an airtight fit. The lens also holds the PCB in place. The Plastic Insulation Sleeve (109) functions as a insulator for the upper Battery's (108) positive side and also traps the Stopper Plate (107), the Non-Conductive Seal (106), the membrane (104) and the Conductive Seal (105) in their respective places once the Upper Metal Housing and the Lower Part (110) has been screwed together. The task of the Insulation Sleeve is also to transfer the necessary pressure to the packings. The Membrane (104) is made of a flexible conducting material, and by changing the flexibility of the Membrane (104) the desired sensitivity for the triggering of the low pressure warning blinking can be achieved. The Conductive Seal (105) is a standard off the shelf Conductive Seal. The Non-Conductive Seal (106) is a standard off the shelf seal. The Stopper Plate (107) is a straight metal plate with a little notch in the middle to enhance the contact with the Membrane (104) and it has also two small holes through it to let the tire pressure through to meet the Membrane (104). The batteries (108) are standard off the shelf alkaline batteries. The Lower Part (110) is threaded to the Upper Metal Housing (103) and also accommodates the Tire Valve Opener (112). The Lower Part (110) is threaded on the lower inside to match the tire valve stem and it has a Rubber Gasket (112) to make a proper seal with the tire valve stem. The Lower Part (110) is made of metal and manufactured in different colors, by e.g. anodizing, for the front and the rear tires.

Since some, (a very small percentage) vehicles are using a metal valve stem which is not insulated from the ground, the Lower Part (110) could be alternately manufactured in a non-conductive material e.g. plastic but then an extra conducting wire needs to be inserted from the bottom of the lower battery (108) to connect to the Upper Metal Housing (103).

The Upper Metal Housing and the Lower Part has a horse-shoe shaped separator (not shown) installed in-between them on delivery. On initial installation the Cap shall be tighten, first with the separator in place, to get the Tire Valve Opener (112) to open the valve and to let the tire pressure enter the Cap and pressurize the Counter Pressure Chamber (113). The separator shall then be removed and the Cap be tightly screwed on the Upper Metal Housing (103) and the Lower Part (110) will now be permanently attached together by adhesive already in place upon delivery of the Cap. This will trap the proper tire air pressure in the Counter Pressure Chamber (113) and calibrate the Cap for this pressure.

While the present invention has now been described with reference to particular embodiments, those skilled in the art will appreciate that various substitutions, omissions, modifications and changes which may be made without departing from the scope or spirit thereof. Accordingly, it is intended that the foregoing description be considered merely exemplary of the invention and not a limitation thereof.

What is claimed is:

1. A tire pressure monitoring device for monitoring tire pressure, said monitoring device comprising:

a housing having a first pressure chamber, a second pressure chamber; and a flexible membrane, wherein said first and second pressure chambers are separated by a flexible membrane, wherein the first pressure chamber is calibrated with air from a tire; and a signaling means for emitting a warning signal when a pressure within the first pressure chamber is greater than a pressure within the second pressure chamber;

wherein the housing is adapted to be mounted onto a tire stem.

said housing having a first pressure chamber, a second pressure chamber, and a flexible membrane, wherein said first and second pressure chambers are separated by a flexible membrane; and a signaling means located within said housing, wherein said signaling means emits a warning signal when a pressure within the first pressure chamber is greater than a pressure within the second pressure chamber.

2. The tire pressure monitoring device of claim 1 wherein said housing further comprises:

a lens, a main housing, and a lower housing, wherein said lens is coupled to a first end of said main housing and said lower housing is coupled to a second end of said main housing.

3. The tire pressure monitoring device of claim 2 further comprising a screw cap that couples said lens to said main housing.

4. The tire pressure monitoring device of claim 3 further including a conductive gasket provided between said lens and said main body.

5. The tire pressure monitoring device of claim 1 wherein said housing further includes at least one battery.

6. The tire pressure monitoring device of claim 1 wherein said flexible membrane is a conductive substance.

7. The tire pressure monitoring device of claim 6 wherein said conductive substance is a conductive metal or conductive rubber.

8. The tire pressure monitoring device of claim 1 wherein said signaling means is coupled to a printed circuit board.

9. The tire pressure monitoring device of claim 1 wherein said signaling means is selected from the group consisting of a light emitting diode (LED), a speaker, a radio frequency (RF) transmitter, and a infrared (IR) transmitter.

10. The tire pressure monitoring device of claim 1 further including a conductive seal provided between said lens and said main body.

11. The tire pressure monitoring device of claim 1 wherein said power supply is at least one battery.

12. The tire pressure monitoring device of claim 1 wherein said signaling means is selected from the group consisting of a light emitting diode (LED), a speaker, a radio frequency (RF) transmitter, and a infrared (IR) transmitter.

13. The tire pressure monitoring device of claim 1 wherein said flexible membrane is a conductive substance.

14. A method of monitoring air pressure within a tire, said method comprising:

providing a tire pressure monitoring device of claim 1;

attaching said tire pressure monitoring device to a tire valve;

calibrating said tire pressure monitoring device with air pressure from the tire;

monitoring a pressure differential between said tire pressure monitoring device and an air pressure of said tire; and emitting a warning signal when said pressure differential exceeds a predetermined pressure differential.

15. The method of claim 14 wherein said calibrating step further includes allowing air from said tire to enter a counter-pressure chamber of said tire pressure monitoring device and sealing said counter-pressure chamber.

16. The method of claim 15 wherein said pressure differential is a difference between the pressure of said counter-pressure chamber and said air pressure of said tire.

17. The method of claim 16 wherein said warning signal comprises a signal selected from the group consisting of a light, a sound, a radio frequency (RF) wave, and an infrared (IR) light.

18. A method of monitoring air pressure within a tire, said method comprising:

providing a tire pressure monitoring device of claim 1;

attaching said tire pressure monitoring device to a tire valve;

calibrating said tire pressure monitoring device;

monitoring a pressure differential between said tire pressure monitoring device and an air pressure of said tire; and emitting a warning signal when said pressure differential exceeds a predetermined pressure differential.

19. The method of claim 14 further comprising:

removing said tire pressure monitoring device from said tire valve;

adding air pressure to said tire; and reattaching said tire pressure monitoring device to said tire valve.

20. The tire pressure monitoring device of claim 1 wherein said housing includes threads for mounting said tire pressure monitoring device onto a tire system.

21. The tire pressure monitoring device of claim 1 wherein said lower housing body includes threads for mounting said tire pressure monitoring device onto the tire valve.

22. A valve cap having an interior air pressure supplied through a conventional tire valve, said valve cap comprising:

a transparent top;

a light emitting diode (LED) attached to a printed circuit board;

an upper housing coupled to a lower housing, the upper housing which accommodates the LED, the printed circuit board, and a flexible membrane;

a counter-pressure chamber, wherein the counter-pressure chamber is a space between the transparent top and the flexible membrane;

a main pressure chamber, wherein the main pressure chamber is a space between the flexible membrane and the lower housing, the counter-pressure chamber having a first open mode wherein the counter-pressure chamber is in atmospheric communication with the main pressure chamber, and the counter-pressure chamber having a second closed mode wherein the counter-pressure chamber is sealed from the main pressure chamber;

at least one battery located within the upper housing; and the lower housing which is internally threaded to mate with a tire valve assembly.

23. A valve cap as defined in claim 22, wherein the circuit board further comprises flashing circuitry.

24. A tire pressure monitoring device for monitoring tire pressure, said monitoring device comprising:

a housing having a first pressure chamber in communication with a second pressure chamber, wherein the first pressure chamber having a first open mode wherein the first pressure chamber is in atmospheric communication with the second pressure chamber, and the first pressure chamber having a second closed mode wherein the first pressure chamber is sealed from the second pressure chamber; and a flexible membrane positioned between the first pressure chamber and the second pressure chamber.

25. A tire pressure monitoring device comprising:

means for mounting the device onto a tire stem;

means for calibrating the device to air pressure in the tire at an initial point in time with air from within the tire;

means for indicating at a subsequent point in time that air pressure in the tire has decreased beyond a predetermined pressure difference, as compared to the pressure in the tire at said initial point in time.

26. A tire pressure monitoring device comprising:

a housing having a first pressure chamber in communication with a second pressure chamber, wherein the first pressure chamber having a first open mode wherein the first pressure chamber is in atmospheric communication with the second pressure chamber, and the first pressure chamber having a second closed mode wherein the first pressure chamber is sealed from the second pressure chamber; and a flexible membrane positioned between the first pressure chamber and the second pressure chamber; and a signaling means for emitting a warning signal when a pressure within the first pressure chamber is greater than a pressure within the second pressure chamber; wherein the housing is adapted to be mounted onto a tire stem.

27. A tire pressure monitoring device attachable to a tire valve for monitoring tire pressure, said tire pressure monitoring device comprising:

a housing including a means for calibrating said pressure monitoring device with air from a tire, a means for sensing a pressure differential, and a means for signaling said pressure differential.

* * * * *